Jan. 24, 1956  A. G. SANDISON  2,732,032
DUST COLLECTOR

Filed Aug. 14, 1953  2 Sheets-Sheet 1

INVENTOR
ALEXANDER G. SANDISON
By Smart & Biggar.
ATTORNEYS.

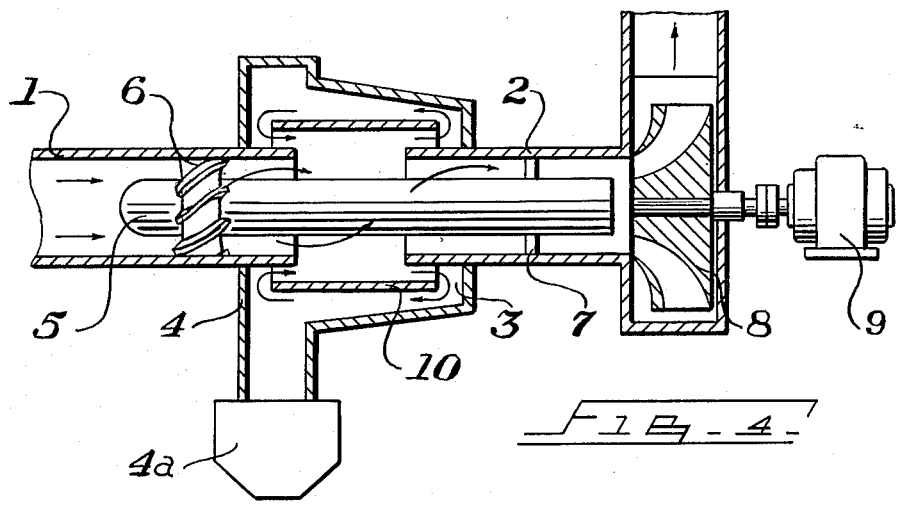
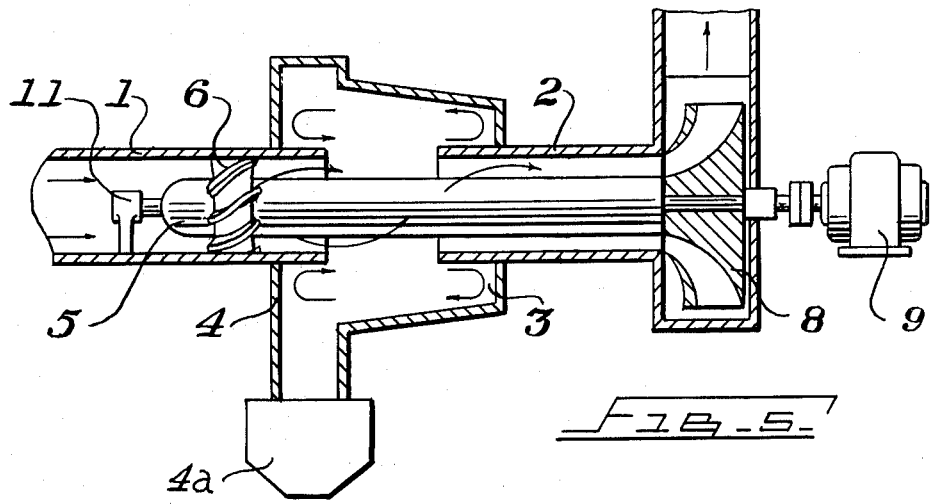
INVENTOR
ALEXANDER G. SANDISON
By Smart + Biggar.
ATTORNEYS.

United States Patent Office 2,732,032
Patented Jan. 24, 1956

2,732,032

DUST COLLECTOR

Alexander G. Sandison, Brantford, Ontario, Canada, assignor to Waterous Limited, Brantford, Ontario, Canada, a corporation of Canada Application August 14, 1953, Serial No. 374,399

Claims priority, application Canada October 10, 1952

2 Claims. (Cl. 183—80)

This invention relates to an apparatus for separating suspended matter from a stream of fluid. In particular the apparatus of the invention is applicable to the collection of dust from gas or air, to the separation of moisture from steam, and to the separation of sand or the like from water.

It is known to construct separating devices of the centrifugal type with straight-through fluid flow, a vortical motion being imparted to the fluid so that the suspended material is centrifuged towards or against the wall of a confining casing which is provided with one or more gaps for the exit of the material to a collecting hopper. For efficient collection it is necessary for the material to pass readily through the gaps, and there must be a minimum of re-entrainment in the main stream of flow. For this reason the exit of the suspended material is sometimes assisted by the use of skimmers or the like at the gaps, or by the provision of an auxiliary suction and separating system to produce a definite flow of fluid through the gaps. The use of skimmers presents difficulties in cases where some of the suspended material may be of large size, while the use of auxiliary collecting systems increases the cost and complication of the installation.

I have found that it is possible to greatly improve the separation of particles at the gap in a separator of the type in which an outlet tube is spaced axially from an inlet tube of substantially the same cross-sectional dimensions so as to leave a gap between the two tubes, and means is provided for imparting swirl to the fluid in the inlet tube, if a housing is provided which surrounds the gap and has a portion which is shaped in the form of a surface of revolution which is co-axial with the tubes, so as to form an eddy-confining chamber.

According to one presently preferred form of the invention, an annular eddy-guiding baffle which is co-axial with the tubes and surrounds the gap is provided in the housing. The gap is preferably at least equal in length to the diameter of the tubes. When an eddy-guiding baffle is employed it is desirable that it should be of greater length than the gap.

In drawings illustrating embodiments of the invention—

Figure 4 is a longitudinal section of an embodiment which is similar to that shown in Figure 3, with the exception that it has an eddy-guiding baffle; and Figure 5 is a longitudinal section showing an embodiment in which the central core is rotated by a centrifugal impeller which draws the stream of fluid through the tubes.

Figure 1:
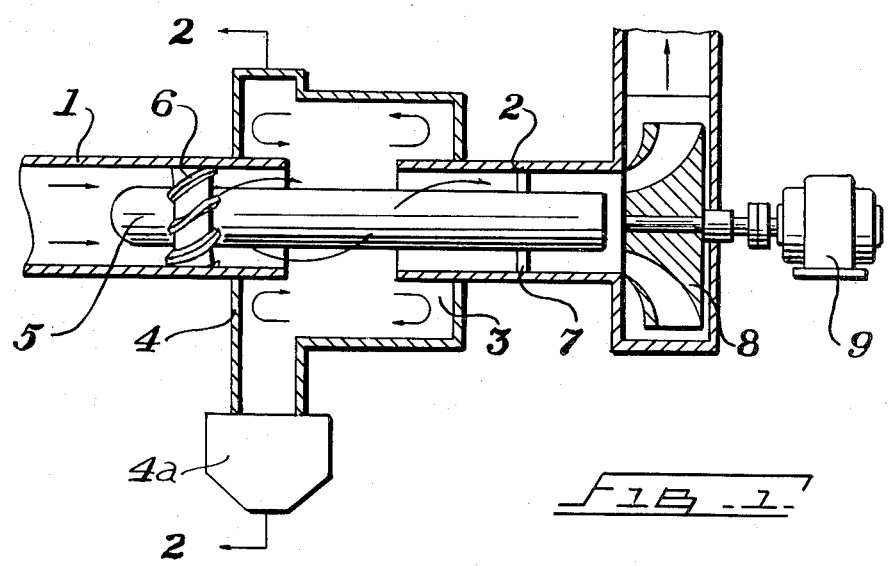
Figure 1 is a longitudinal section of one embodiment.
Figures 2, 3:
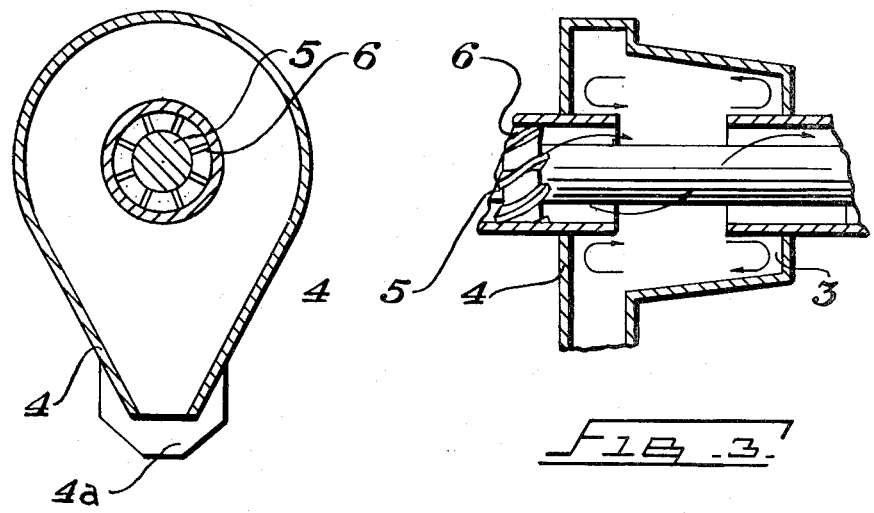
Figure 2 is a transverse section on the line 2—2 of Figure 1.
Figure 3 is a longitudinal section of an embodiment which is similar to the one shown in Figures 1 and 2, with the exception that it has a conical eddy-confining housing.

Referring first to Figures 1, 2 and 3, the separator has an inlet tube 1, and an outlet tube 2. These tubes are co-axial, are of substantially the same cross section, and are axially spaced so as to leave a gap between their adjacent ends. This gap is surrounded by a housing defining an eddy-confining chamber 3, formed in the shape of a surface of revolution co-axial with tubes 1 and 2 (which tubes are preferably cylindrical as illustrated), and an extension 4 of bunker form. The housing may be cylindrical as illustrated in Figures 1 and 2, but is advantageously in the form of a cone which decreases in diameter toward the outlet end of the apparatus, as has been illustrated in Figure 3. A core 5 is disposed coaxially within the tubes 1 and 2, and vanes 6 extend from core 5 to meet the inlet tube 1. These vanes are designed to impart a vortical motion to a stream of fluid which is being forced through the tubes. The core 5 is fixedly supported within the tubes by tie rods 7 (in tube 2) and by the vanes 6, which are attached both to the inlet tube 1 and to the core. An impeller 8 is disposed at the aft end of the outlet tube 2, and the inlet aperture of impeller 8 matches the aperture between tube 2 and core 5.

In this form of the separator, a stream of fluid containing separable suspended material is drawn through the separator by the action of the impeller 8, and, when it passes through the vanes 6, is given a vortical motion which centrifuges the separable suspended material towards or against the wall of inlet tube 1 and thence through the gap between tubes 1 and 2 into eddy-confining chamber 3. The main flow continues through outlet tube 2, and impeller 8, so that a straight-through flow is obtained, resulting in relatively low frictional loss. A vortical eddy in the general direction indicated by the arrows takes place in chamber 3 and, since a tangential or swirl component of motion is retained in this eddy, the material is further centrifuged towards or against the wall of chamber 3, and finally finds its way into the bunker extension 4 of the housing, whence it may be drawn off through a suitable gate device 4a of conventional construction. It will be understood that while the suspended material will not necessarily be deposited into the bunker 4 during its first circulation around in the eddy established in chamber 3, nevertheless the vortical motion in the main stream will promote a centrifugal field which will prevent any substantial re-entrainment of the separated suspended material into the outlet tube 2, so that virtually all the separable material which enters chamber 3 will finally be deposited in the bunker extension 4. The preferred conical form of eddy-confining housing (illustrated in Figure 3) has the advantage that the heavier separated material more readily proceeds to the bunker extension 4.

In order that an eddy flow of suitable characteristics may be maintained it is desirable for the gap between the ends of tubes 1 and 2 to be fairly long, and preferably of a length which is at least equal to the diameter of the outlet tube. It is also desirable for the ends of the tubes to project an appreciable distance into the housing; or, otherwise stated, it is desirable to have the eddy-confining housing of appreciably greater length than the gap. The use of the core 5 is advantageous in tending to stabilize the flow and reduce turbulence. As the fluid emerges from tube 2 and enters the impeller inlet it still has considerable swirl velocity. Where a centrifugal type of impeller is used it is preferable to arrange for rotation of the impeller in the direction of swirl. Conditions may, with advantage, be so arranged that the speed of rotation of the swirl approximates the speed of rotation of the impeller; and under these conditions entry of the fluid into the impeller takes place without substantial shock so that the energy of rotation of the fluid may then be recovered to a large extent in a suitable diffusion ring, volute or the like provided in the impeller casing, whereby the over-all power consumption may be reduced. With this arrangement it is possible to use an impeller of simple type with straight radial vanes and still maintain a high over-all efficiency. Diffusion rings and volutes of a suitable construction for this purpose are well known in connection with centrifugal fans and pumps.

In Figure 4 there is illustrated a preferred form of the invention in which an annular baffle 10 is located within chamber 3, the baffle surrounding the gap between tubes 1 and 2. Baffle 10 is preferably greater in length than the gap, and assists in guiding the eddy flow indicated by the arrows.

A modification of the arrangement of Figure 3 is illustrated in Figure 5. In the Figure 5 arrangement, the end of core 5 which is located in the inlet tube 1 is supported by a bearing 11, while the other end of the core is rigidly secured to the impeller 8, so that it rotates with the impeller. Rotation of the core 5 is advantageous since friction opposing the swirl of the fluid is thereby reduced and better persistence of the swirl is obtained. Since, in this particular form of the invention, the core 5 is rotatable, the tie rods 7 shown in Figures 1 to 4, are not employed, the vanes 6 are secured only to the tube 1, and while they project inwardly towards the core 5 they are slightly spaced therefrom so as not to interfere with the rotation of the core.

What I claim as my invention is:

1. Apparatus for the separation of suspended material from a stream of fluid, comprising an inlet tube adapted to receive the stream of fluid, an outlet tube substantially coaxial with and of substantially the same cross-section as the inlet tube, the tubes being spaced axially to leave a gap between the outlet end of the inlet tube and the inlet end of the outlet tube, means for forcing a stream of fluid through said tubes, means in said inlet tube for imparting swirl to the stream of fluid, an eddy-confining chamber surrounding said gap and located to receive material centrifugally separated in said gap, said chamber comprising a substantially conical frustum disposed coaxially with respect to said tubes with its larger end facing the inlet side of the apparatus and means for withdrawing separated material from said eddy-confining chamber, said withdrawing means comprising a bunker connected to the larger end of said eddy-confining chamber and a discharge port in the lower portion of said bunker.

2. An apparatus as defined in claim 1, wherein an annular eddy-guiding baffle is disposed within said eddy-confining chamber, said baffle surrounding said gap and being co-axial with said tubes.

References Cited in the file of this patent

UNITED STATES PATENTS

| | | |
|---|---|---|
| 837,705 | Morse | Dec. 4, 1906 |
| 1,525,249 | Mastenbrook | Feb. 3, 1925 |
| 2,059,521 | Hawley | Nov. 3, 1936 |
| 2,201,301 | Richardson | May 21, 1940 |
| 2,244,919 | Peebles | June 10, 1941 |
| 2,370,629 | Appeldoorn | Mar. 6, 1945 |
| 2,487,633 | Breslove | Nov. 8, 1949 |
| 2,647,588 | Miller | Aug. 4, 1953 |
| 2,650,675 | Yellott | Sept. 1, 1953 |

FOREIGN PATENTS

| | | |
|---|---|---|
| 170,268 | Austria | Feb. 11, 1952 |
| 849,349 | Germany | Sept. 15, 1952 |